United States Patent
Watts

[15] 3,667,202
[45] June 6, 1972

[54] BEATER MECHANISM FOR AGRICULTURAL ROW CROP HARVESTER

[72] Inventor: John P. Watts, Route 2, P.O. Box 249, Hillsboro, Oreg. 97123

[22] Filed: Feb. 3, 1971

[21] Appl. No.: 112,241

[52] U.S. Cl. ............................................................56/330
[51] Int. Cl. ........................................................A01g 19/00
[58] Field of Search ..................................56/330, 328, 1, 29

[56] References Cited

UNITED STATES PATENTS 3,126,692   3/1964   Weygandt et al. .........................56/330
3,129,551   4/1964   Lasswell, Jr. ..........................56/328 R
3,439,482   4/1969   Orton .....................................56/330

*Primary Examiner*—Russell R. Kinsey
*Attorney*—Kolisch & Hartwell

[57] ABSTRACT

Beater mechanism for an agricultural row crop harvester. The mechanism includes a plurality of elongated beater members, each of which is pivoted for swinging, under power, into the path of plants (in a row), which plants move relative to the harvester as the latter travels over a field. The beater members have somewhat broom-like constructions, with each at its free end including a plurality of elongated side-by-side adjacent plant-engaging elements which strike stems in plants to dislodge produce.

12 Claims, 2 Drawing Figures

PATENTED JUN 6 1972

3,667,202

John P. Watts
INVENTOR
BY Kolisch + Hartwell
Attys.

3,667,202

BEATER MECHANISM FOR AGRICULTURAL ROW CROP HARVESTER

BACKGROUND AND SUMMARY OF THE INVENTION

This invention pertains to automated harvesting equipment for an agricultural row crop, and more particularly to novel beater means in such equipment for beating stems in plants for the purpose of dislodging produce. For the purpose of illustration herein, a preferred embodiment of the invention is described in conjunction with the harvesting of fruit berries, such as blackberries, wherein the invention has been found to have particular utility.

In recent years, and for many reasons, there has been an increasing interest in the development and use of automated agricultural harvesting equipment.

A general object of the present invention is to provide novel apparatus for use in the automated harvesting of produce from plants in an upstanding row crop, such as from a crop of blackberry plants. The relatively brief, and somewhat unpredictable, optimum picking times for such produce, coupled with the difficulties today of obtaining, on short notice, a sufficient farm labor (picking) force, make the use of such automated harvesting apparatus especially desirable.

There are, of course, a number of important considerations that must be taken into account if such apparatus is to perform satisfactorily in connection with the harvesting, or picking, of berries such as those mentioned. One of these considerations is that the harvesting apparatus, or equipment, must do a thorough job in removing ripe fruit from plants. It must be able to do this relatively quickly and economically, and with minimal damage to the fruit and plants. When such equipment makes a pass along a row of plants, it should remove a minimum amount of unwanted material (such as leaves and nonripe fruit) with the ripe fruit.

Thus, a more particular object of the invention is to provide apparatus for use in harvesting equipment of the type mentioned which takes these important considerations into account in a practical and satisfactory manner.

More specifically, an object of the invention is to provide novel beater means for use in a row crop berry harvester, for beating stems in plants to remove berries, which beater means is capable of thoroughly removing such berries with minimal damage to plants.

According to a preferred embodiment of the invention, the proposed beater means includes a plurality of elongated beater members supported on the frame which is adapted to straddle and move along a row of plants in a field. The beater members are adapted to strike opposite sides of the plants in a row, at different elevations on the plants.

The beater members, which have somewhat broom-like constructions, are pivoted, and are swung under power into and out of the path of plants straddled by the frame. More specifically, each beater member includes adjacent its free end a plurality of elongated, independently and relatively movable plantengaging elements (such as the bristles in a broom) disposed in side-by-side abutting adjacency in a generally upright plane. These plant-engaging elements collectively define a generally upright planar plant-engaging panel which is for striking the stems in a plant. Because of the relative and independent movement permitted between the elements, the geometry of the panel which they define tends to change as they are thrust against a plant, and this feature contributes to thorough nondestructive harvesting of berries. In other words, the individual elements tend to penetrate into the inside of the plant to assure thorough removal of ripe fruit, and when necessary yield to prevent excessive and possibly damaging pressure against stems in a plant.

DESCRIPTION OF THE DRAWINGS

These and other objects and advantages attained by the invention will become more fully apparent as the description which follows is read in conjunction with the accompanying drawings, wherein.

DETAILED DESCRIPTION OF THE INVENTION

Figure 1:
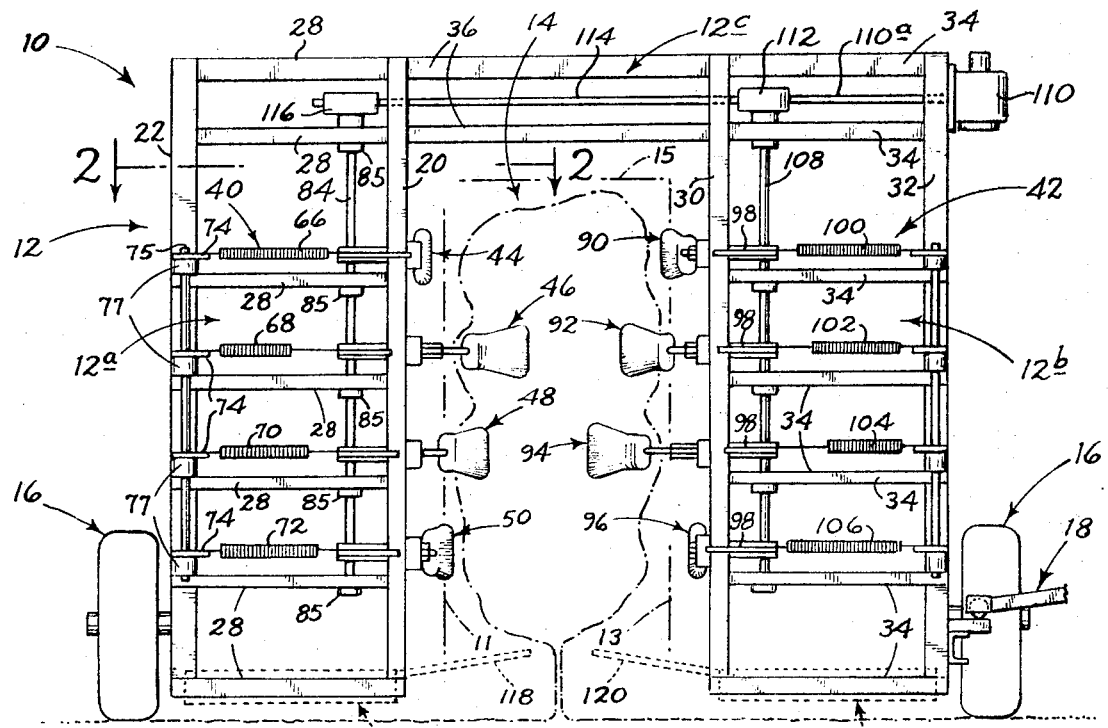
FIG. 1 is a simplified front elevation illustrating a row crop harvester incorporating beater means constructed according to the invention.

Turning now to the drawings, and referring first to FIG. 1, indicated generally at 10 is an agricultural row crop harvester which is adapted for harvesting produce such as blackberries. The harvester includes a frame 12 having spaced-apart left and right side portions 12a, 12b, respectively, in FIG. 1 joined through a center portion 12c. The frame in the harvester may be constructed in any suitable manner, and in the particular embodiment illustrated, is formed of welded-together steel channel and angle members. Frame 12 is adapted to straddle a row of plants as the harvester travels over a field, and as it is viewed along its longitudinal axis (as in FIG. 1), it will be noted that its side and center portions define what might be thought of as a tunnel or passage 14 that accommodates such plants. The dimensions of this tunnel are, of course, a matter of choice and depend on the particular crop for which the harvester is intended. The tunnel in any event must be large enough to accommodate the upright zone occupied by plants in a row. Such a zone in the case being described herein is defined by planes 11, 13, 15. In frame 12, tunnel 14 has a width of about 6 feet and a height of about 10 feet.

Another matter of choice is the length of the frame. Obviously, this length must be sufficient to accommodate the particular plant-engaging, and produce-gathering and delivering equipment which is intended to be carried on the frame. In the case of the particular frame illustrated, its length is about 12 feet.

Frame 12 is adapted for travel over the ground, with its rear end (which is away from the viewer in FIG. 1) supported on wheel assemblies 16. The front end of the frame, at its right side in FIG. 1, is connected through a conventional hitch mechanism shown partially at 18 to a suitable towing vehicle, such as a conventional agricultural tractor (not shown). With such an arrangement, the tractor is disposed forwardly and to one side of the frame, and when driven, tows the frame in the direction of arrow 19 (see FIG. 2)—which is in a direction out of the plane of FIG. 1. In particular, and during a normal harvesting operation, the towing tractor travels along and between a pair of rows of plants in a field, with the harvester frame straddling one of these rows. Obviously, the exact way in which a towing vehicle is attached, and the particular relative location of the towing vehicle and harvester frame, are matters of choice.

Figure 2:
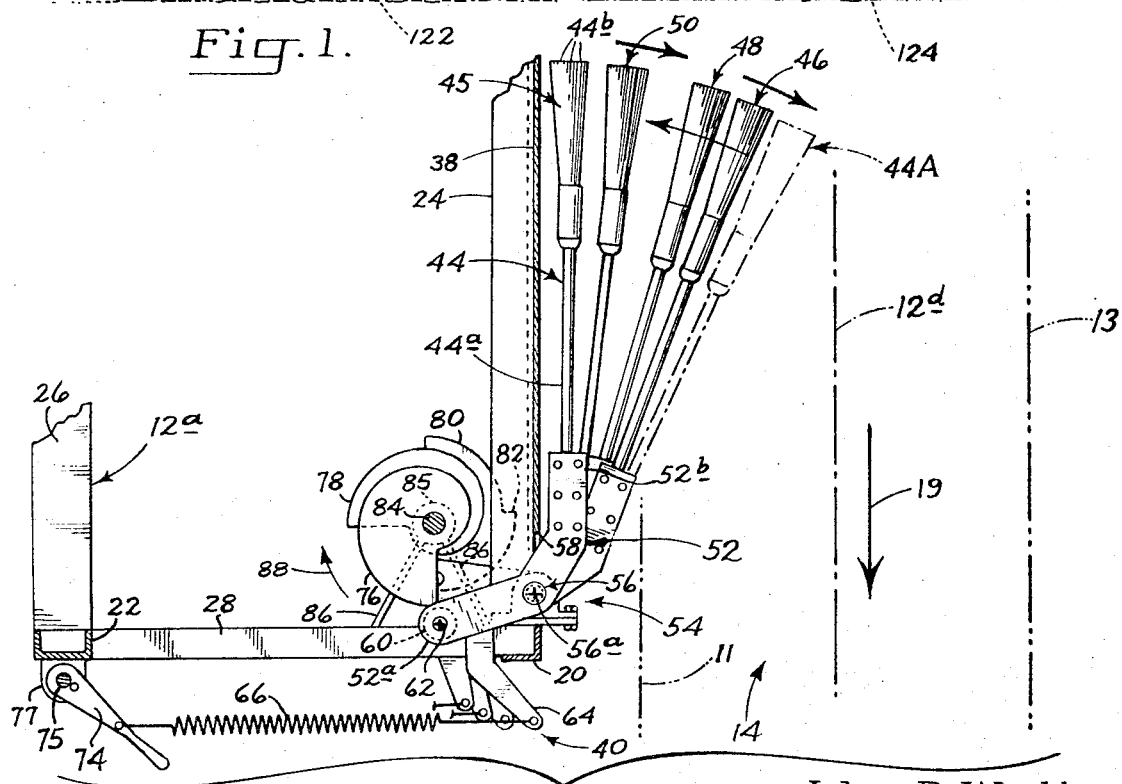
FIG. 2 is an enlarged fragmentary top view, taken generally along the line 2—2 in FIG. 1, illustrating details of the construction mounting and action of beater elements in the beater means of the invention.

Considering frame 12 in somewhat greater detail, in the particular embodiment illustrated, the two side portions of the frame are essentially identical (though reversed) in construction. Referring to FIGS. 1 and 2 together, and considering specifically portion 12a, it comprises a plurality of inner uprights, such as upright 20 and a plurality of outer uprights, such as upright 22. The various adjacent inner uprights are interconnected through a plurality of generally horizontally and longitudinally extending members, such as that shown at 24 in FIG. 2; and similarly, the various adjacent outer uprights are interconnected through a plurality of horizontally and longitudinally extending members, such as member 26 shown in FIG. 2. Interconnecting the structures made up of uprights 20 and members 24 on the one hand, and uprights 22 and members 26 on the other hand, adjacent opposite ends of the frame portion, are a plurality of substantially horizontal transverse members, such as members 28.

Frame portion 12b includes inner and outer uprights 30, 32 corresponding to uprights 20, 22, respectively, longitudinal members (concealed) corresponding to longitudinal members 24, 26, and transverse members 34 corresponding to transverse members 28.

Center portion 12c comprises a plurality of substantially horizontal, transversely extending members, such as those shown at 36 in FIG. 1, which interconnect uprights 20, 30 at points spaced along the lengths of the side portions in the frame.

Referring for a moment particularly to FIG. 2, suitably fastened to the inner uprights and longitudinal members (20, 24) in frame portion 12a is a large flat and relatively thin plate 38 formed of a suitable rigid material such as plywood. It will be apparent that plate 38 is disposed in a generally upright plane which substantially parallels the longitudinal axis of frame 12, such axis being shown at 12d in FIG. 2. Plate 38 extends between the front and rear ends of frame portion 12a, and between the lowermost transverse members 28 in the frame portion and the lowermost transverse members 36 in central portion 12c. A similar plate (concealed in FIG. 1) is mounted in a similar manner on side portion 12b in the frame.

Mounted on frame 12 according to the present invention are two beater mechanisms, or means, 40, 42 constructed as contemplated herein. Beater mechanism 40 is supported on frame portion 12a, and beater mechanism 42 is supported on frame portion 12b.

The two beater mechanisms are similar in construction, and considering mechanism 40 with reference to FIGS. 1 and 2, it comprises a plurality—namely, four—of elongated vertically spaced beater members 44, 46, 48, 50. These members are substantially the same in construction and mounting. Considering member 44, it has a substantially broom-like construction, and in fact, preferably takes the form of a conventional readily available broom of the style illustrated in the drawings. Such a broom, which can be conveniently obtained, has been found to perform very satisfactorily. However, while such an article (namely a broom) has been found to be convenient for use as a beater member herein, it will be obvious from the description which now follows that other specific constructions may be employed.

Considering the essential parts of member 44 (and of the other beater members herein), it includes an elongated substantially rigid slender arm 44a (such as the handle in a broom) on the outer or free end of which are mounted a plurality of flexible, independently and relatively movable elements 44b (such as the bristles in a broom). Elements 44b preferably substantially parallel one another, and are disposed in side-by-side abutting adjacency in a generally upright plane. In addition, these elements are preferably arranged with their inner ends anchored against movement relative to one another and their outer ends free, and in a bundle having considerable thickness when viewed on edge as in FIG. 2. As will be more fully explained, elements 44b are for striking stems in a plant for the purpose of dislodging fruit, and these elements collectively define what might be thought of as a changeable-configuration plant-engaging panel 45.

This type of construction in the beater members assures a number of important results in the harvesting of produce such as blackberries. The panel just mentioned defined by a bundle of elements 44b, when swung against and into a plant, engages the plant over a relatively broad area. This minimizes the likelihood of excessive and possibly damaging forces or pressures being exerted against stems in the plant. Because of the fact that the elements forming a panel are independently and relatively movable, they yield and shift positions relative to one another when driven against a plant. This assures that some of the elements can pass outer stems and reach into the interior of the plant to dislodge ripe fruit. Such relative movement between the elements not only contributes to thorough removal of ripe fruit, in the inside as well as the outside of a plant, but also permits the panel formed by the elements to deform around blocking stems (particularly outer stems) in the plant to minimize damage to such stems.

Considering the means provided for mounting beater member 44, it comprises a rocker 52 having the angular configuration illustrated in FIG. 2. Rocker 52 is pivoted at 56 on the inner front corner of frame portion 12a (and at the elevation illustrated in FIG. 1) for rocking about a substantially upright axis 56a. The rocker includes an arm portion 52a which extends generally to the left of pivot connection 54 in the figures, and an arm portion 52b which extends generally to the right and upwardly of pivot connection 54 in FIG. 2. Arm portion 52b extends through a suitable clearance opening 58 provided in plate 38. The inner end of arm 44a of beater member 44 is clamped inside a suitable receiving socket provided in arm portion 52b. Member 44 is thus mounted for swinging or reciprocating back and forth about axis 56a.

Journaled on the left end of arm portion 52a is a roller 60. This roller is journaled for rotation about an axis 62 which substantially parallels axis 56a. Also mounted on arm portion 52a is a bracket 64 whose function will be explained shortly.

As has previously been mentioned, beater members 46, 48, 50 are substantially the same in construction as beater member 44; and, they are mounted in a similar fashion on frame portion 12a. As can be seen in FIG. 1, beater member 46 is disposed below member 44, member 48 below member 46, and member 50 below member 48.

Beater members 44, 46, 48, 50 are biased to swing inwardly toward the center of tunnel 14 by means of tension springs 66, 68, 70, 72, respectively. These springs are substantially the same in construction and strength. The right ends in the figures of the four springs mentioned are secured to the outer ends of the brackets (like bracket 64) attached to the rockers for beater members 44, 46, 48, 50. This can be seen clearly in FIG. 2 where the right end of spring 66 is attached to the outer end of bracket 64. The left ends of the springs in the figures are connected to cranks 74 which are anchored at vertically spaced points on an upright shaft 75 which is journaled in bearings 77 mounted on the front upright 22 in frame portion 12a.

Cranks 74 and shaft 75 may be turned as a unit about the longitudinal axis of the shaft. Shaft 75, and hence cranks 74, may be adjusted to any desired angular position relative to the axis of the shaft, and such action establishes the amount of tension in the springs. Any suitable form of adjusting means may be provided for this purpose.

According to the invention, the beater members 44, 46, 48, 50 are swung outwardly (relative to frame axis 12d), or retracted, against the action of the biasing springs by means of cams 76, 78, 80, 82, respectively (see FIG. 2), which are anchored at vertically spaced points on an upright shaft 84. These four cams are substantially identical in construction, and have the profiles illustrated in FIG. 2. Adjacent cams are disposed at angles relative to one another. More specifically, and considering the cams as viewed in FIG. 2, cam 78 is disposed 90° clockwise on the shaft from cam 76, cam 80 is disposed 90° clockwise on the shaft from cam 78, and similarly, cam 82 is disposed 90° clockwise on the shaft from cam 80.

Shaft 84 is journaled in a plurality of vertically spaced bearings 85 which are mounted on frame portion 12a through brackets such as those shown at 86 in FIG. 2. Cams 76, 78, 80, 82 are adapted to turn as a unit with shaft 84 about the latter's axis.

The cams, through engaging the rollers (like roller 60) on the rockers (like rocker 52) are adapted to retract, at different times, their associated beater members to positions such as that shown in solid outline in FIG. 2 for beater member 44. Such a position, it will be noted, places panel 45 out and to one side of the zone previously described between planes 11, 13. In addition, the cams permit their associated beater members to be swung at different times by their respective biasing springs inwardly toward frame axis 12d. In particular, each biasing spring is permitted to swing its associated beater member inwardly to a position such as that shown in dash-dot outline at 44A in FIG. 2 for beater member 44. With member 44 in such a position, it will be noted that panel 45 is within the zone between planes 11, 13.

As will be more fully explained, shaft 84 is turned under power in the direction of arrow 88 in FIG. 2. With such turning of this shaft, each beater member 44, 46, 48, 50 is reciprocated alternately toward and away from the center of tunnel 14. More specifically, and as will be apparent from FIG. 2, each beater member is swung inwardly under the influence of its associated biasing spring when the roller on its associated rocker is released from the radial high point on its associated cam. After having swung inwardly in this manner, the beater member is retracted gradually due to engagement of its associated roller and cam. The beater members in mechanism 40 swing inwardly in the sequence of: member 50, member 48, member 46, member 44, and then member 50 again, and so on. In the drawings herein, these beater members are illustrated in the relative positions which they have at a moment in time just after member 46 has been swung inwardly by spring 68, and just before member 44 will be swung by its biasing spring 66.

It will be apparent from the preceding description that, depending upon the tension in the biasing springs for the beater members, the latter can be swung inwardly against a plant in tunnel 14 with different predetermined forces. Obviously, because of the way in which the rollers on the rockers are released from the radial high points in the cams, the beater members swing inwardly quite rapidly. They are retracted more gradually.

As was mentioned briefly earlier, mechanism 42 is similar in construction to mechanism 40. The various parts in mechanism 42 are disposed in what might be thought of as mirror-image positions and orientations relative to the corresponding parts in mechanism 40. Mechanism 42 differs from mechanism 40 chiefly in that the sequence of operation for its beater members is the reverse of that for the beater members in mechanism 40.

Mechanism 42 comprises four beater members 90, 92, 94, 96 which are the same in construction as the beater members previously described, and which correspond, in position on frame 12, to beater members 44, 46, 48, 50, respectively. The beater members in mechanism 42 are fastened to rockers 98 which correspond to rocker 52; and rockers 98 carry rollers (concealed) corresponding to rollers 60. Tension springs 100, 102, 104, 106, which correspond to springs 66, 68, 70, 72, respectively, perform in the same manner with respect to beater members 90, 92, 94, 96, respectively.

In addition, cams (concealed), essentially the same in design as the cams previously described, are provided for retracting the beater members in mechanism 42, and are mounted on a shaft 108 which corresponds to shaft 84. Unlike shaft 84 which is intended to turn clockwise about its axis when viewed axially from its upper end, shaft 108 is intended to turn counterclockwise when so viewed. The cams in mechanism 42 are anchored to shaft 108 with orientations taking this different direction of rotation into account, and are angularly disposed relative to one another to produce a sequence of operation wherein beater member 90 swings inwardly under the influence of its biasing spring, followed by beater member 92, then beater member 94, then beater member 96, and again beater member 90, and so on. It will be obvious to those skilled in the art, based on the description given above of mechanism 40, how the cams in mechanism 42 may be arranged to produce such operation.

Shafts 84, 108 and springs 66, 68, 70, 72, 100, 102, 104, 106 collectively comprise power-operated means herein.

Suitably mounted on the top of the right side of frame portion 12b in FIG. 1 is a conventional gasoline engine 110. The output shaft 110a of this engine is connected through a conventional gear mechanism 112 to shaft 108. In addition, it is connected through this gear mechanism to a shaft 114 which is drivingly connected through another conventional gear mechanism 116 to shaft 84. With operation of engine 110, shafts 84, 108 are driven under power in the angular directions previously mentioned.

Explaining how the apparatus described herein performs, during a harvesting operation the harvester is towed along a row of plants, with frame 12 straddling the row, such as is illustrated in FIG. 1. With engine 110 operating, the beater members swing inwardly and are retracted in the manner and sequence described above. The plant-engaging elements on the outer ends of the beater members (i.e., the bristles in the case of brooms being employed as beater members), strike the stems in the plants (at different elevations thereon) and dislodge ripe berries. An important feature of the invention is that the beater members are swung yieldably inwardly toward a plant. The use of springs for such inward swinging is what produces this. As a consequence of such action, the beater members are not forced against a plant in a way that might break a member should it encounter an obstruction, such as a very stiff trunk in a plant, or a post or the like employed in a row of plants. In addition, such action helps to minimize the likelihood of plant damage.

The panels, such as panel 38, along opposite sides of tunnel 14 prevent berries from flying outwardly from the harvester where they might be lost. The dislodged berries are collected in any suitable manner, as by means of conventional hinged fishplate mechanisms (such as those shown in dashed block outline at 118, 120 on the left and right sides of the row in FIG. 1), and are discharged from such mechanism onto suitable conveyers carried adjacent the bases of the side portions in frame 12. Such conveyers, illustrated in dashed block outlines at 122, 124 on frame portions 12a, 12b, respectively, may be constructed and configured in any desirable manner.

While a preferred embodiment of the invention has been described herein, it is appreciated that variations and modifications may be made without departing from its spirit.

It is claimed and desired to secure by LETTERS PATENT:

1. Beater means for an agricultural row crop harvester having a frame supported for ground travel along a row of plants, said beater means comprising
    an elongated beater member including adjacent one of its ends a plurality of elongated, independently and relatively movable plant-engaging elements which collectively define a generally upright, planar, changeable-configuration plant-engaging panel, and
    mounting means for said member adapted to mount the same on said frame for alternating movement thereon toward and away from plants in a row during a harvesting operation to strike stems in such plants with said elements.

2. The beater means of claim 1, wherein said beater member is broom-like in construction.

3. Beater means for an agricultural row crop harvester having a frame supported for ground travel along a row of plants, said beater means comprising
    an elongated beater member including adjacent one of its ends a plurality of elongated, independently and relatively movable plant-engaging elements disposed in side-by-side abutting adjacency in a generally upright plane, and
    mounting means for said member adapted to mount the same on said frame for alternating movement thereon toward and away from plants in a row during a harvesting operation to strike stems in such plants with said elements.

4. The beater means of claim 3, wherein said elements have one set of adjacent ends which are anchored against relative movement, and another set of adjacent ends which are free.

5. The beater means of claim 4, wherein said elements, between their said one and other sets of ends, generally parallel one another.

6. The beater means of claim 5, wherein said beater member is broom-like in construction.

7. Beater means for an agricultural row crop harvester where the harvester has a frame portion which, with travel of the harvester along a row of plants during a harvesting operation, is adapted to move adjacent the generally upright zone occupied by such plants, said beater means comprising
    an elongated beater member including adjacent one of its ends a plurality of elongated, independently and relatively movable plant-engaging elements which collectively define a generally upright, planar, changeable-configuration plant-engaging panel, and means for mounting said member on said frame portion for reciprocal movement, during such a harvesting operation, between one position with said panel facing and disposed to one side of such a zone, and another position with said panel within said zone.

8. Beater means for an agricultural row crop harvester where the harvester has a frame portion which, with travel of the harvester along a row of plants during a harvesting operation, is adapted to move adjacent the generally upright zone occupied by such plants, said beater means comprising at least a pair of elongated beater members with each including adjacent one of its ends a plurality of elongated, independently and relatively movable plant-engaging elements which collectively define a generally upright, planar, changeable-configuration plant-engaging panel, and means for mounting said members at vertically spaced locations on said frame portion for reciprocal movement, during different respective time intervals in such a harvesting operation, between one set of positions with said panels disposed to one side of such a zone, and another set of positions with said panels within said zone.

9. Beater means for an agricultural row crop harvester where the harvester has a frame which, with travel of the harvester along a row of plants during a harvesting operation, is adapted to straddle and move along the generally upright zone occupied by such plants, said beater means comprising a plurality of elongated beater members, each including adjacent one of its ends a plurality of elongated, independently and relatively movable plant-engaging elements which collectively define a generally upright, planar, changeable-configuration plant-engaging panel, and means for mounting different ones of said members at vertically spaced locations on opposite sides of said frame for reciprocal movement of a member, during such a harvesting operation, between one position with its said panel disposed to one side of such a zone, and another position with said panel within the zone, with the panels of different beater members moving between their respective said one and said other positions during different respective time intervals.

10. In a ground-traveling agricultural row crop harvester having a frame portion adapted, with travel of the harvester along a row of plants during a harvesting operation, to move along and adjacent the generally upright elongated zone occupied by the plants in such a row, beater means for dislodging produce from such plants comprising a plurality of elongated beater members, each including adjacent one of its ends a plurality of elongated, independently and relatively movable plant-engaging elements which collectively define a generally upright, planar, changeable-configuration plant-engaging panel, mounting means for each member mounting the same on said frame portion for reciprocation thereon toward and away from plants in a row during a harvesting operation to strike stems in such plants with the elements in the member, and power-operated means operatively connected to said members for reciprocating the same, with the plant-engaging panels in the members on the latter reciprocating moving alternately into and out of such a zone.

11. The beater means of claim 10, wherein the plant-engaging elements in a member are disposed generally in side-by-side parallel adjacency.

12. The apparatus of claim 11, wherein each beater member has a broom-like construction.

* * * * *